United States Patent [19]
Place

[11] 3,788,650
[45] Jan. 29, 1974

[54] ROTARY SEAL

[75] Inventor: Bruce S. Place, Warwick, R.I.

[73] Assignee: Magnetic Seal Corp., West Barrington, R.I.

[22] Filed: Oct. 4, 1971

[21] Appl. No.: 185,935

[52] U.S. Cl.......................... 277/38, 277/43, 277/92
[51] Int. Cl............................................... F16j 9/00
[58] Field of Search....... 277/38, 86, 41, 80, 91, 88, 277/89, 36, 43

[56] References Cited
UNITED STATES PATENTS
3,588,127  6/1971  Coleman............................. 277/92

2,736,579  2/1956  Dickinson........................ 277/81 X
2,890,901  6/1959  Martin.................................. 277/36
3,050,319  8/1962  Colby.................................. 277/41

*Primary Examiner*—Samuel B. Rothberg
*Attorney, Agent, or Firm*—Herbert B. Barlow et al.

[57] ABSTRACT

A rotary seal is provided which will operate to maintain a seal between relative rotating parts when there is substantial axial movement between the parts by providing a pair of annular members telescopically disposed which will telescope on axial relative movement of the parts. Flexible sealing is provided between the two telescoping parts to maintain a fluid tight arrangement.

2 Claims, 3 Drawing Figures

PATENTED JAN 29 1974 3,788,650

ROTARY SEAL

BACKGROUND OF THE INVENTION

In the art of rotary seals, it has been common practice to urge the sealing faces together by means of a compression spring. If axial movement between the housing through which a rotating shaft passes and the shaft occurs, the face load, that is, the pressure exerted between the sealing faces will vary as the relative positions change. Since it is common to have one of the seal faces manufactured of carbon, it becomes obvious that considerable wear of the carbon will take place as the face load is increased. Further there are frictional forces involved which tend to prevent rapid movement of the spring loaded member which usually drivingly engages the shaft by means of an O-ring that is under compression, which O-ring must of necessity distort and roll. An example of a prior art construction where this action occurs is shown in the Payne U.S. Pat. No. 2,561,132. If the bias force between the sealing faces is provided by a magnetic force, a slightly different problem exists and, generally speaking, the amount of movement of the driving and sealing O-ring is limited as, for example, is disclosed in the Colby U.S. Pat. No. 3,080,170.

SUMMARY OF THE INVENTION

It is a primary object of the present invention to provide a rotary seal of the magnetic type wherein the sealing parts may permit relative movement between the rotating and fixed parts of a range in excess of three thirty-seconds of an inch, while at the same time maintaining a constant face load between the sealing faces. This is accomplished by providing a structure which may be assembled onto a rotating shaft comprising two telescoping members to rotate with the shaft. The first telescoping member or outer sleeve is of annular form and carries a sealing face on one end thereof. It receives within it an inner sleeve part which drivingly engages the shaft. An anti-friction means is provided between the member and sleeve to permit axial movement therebetween and also to provide a drive between the sleeves. This is done by providing an axially extending groove in each of the parts and receiving in that groove a ball. Liquid sealing between these two telescoping portions is preferably had by means of an annular bellows connection, which bellows does not add to or detract from the normal sealing face loads.

DESCRIPTION OF THE PREFERRED EMBODIMENT

Figure 1:
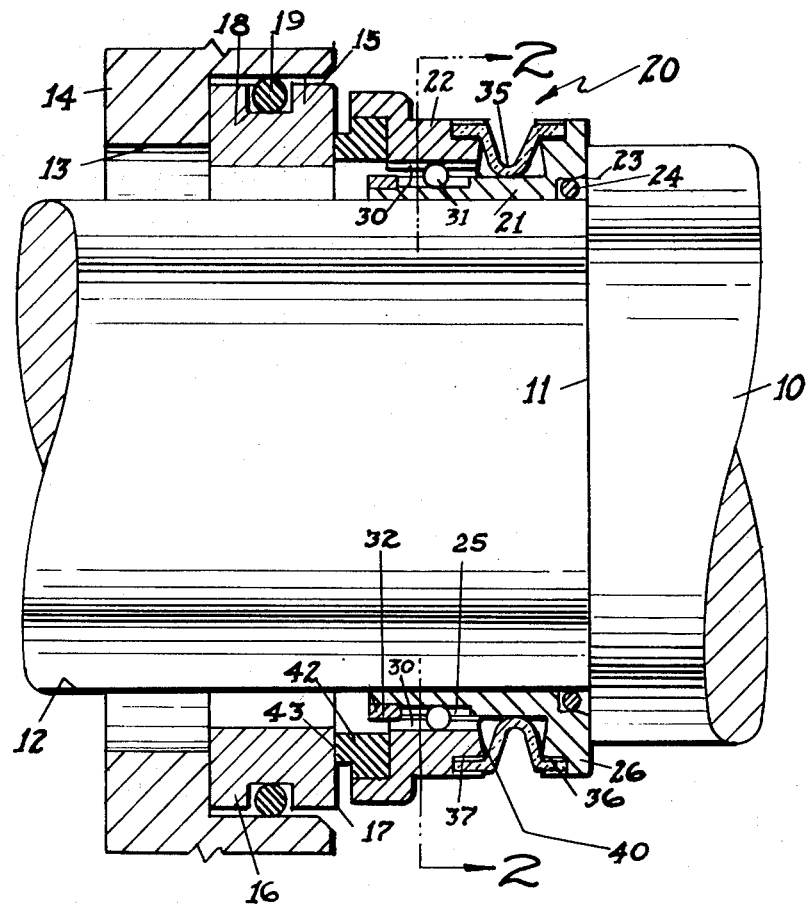
FIG. 1 is a longitudinal sectional view through a fragmentary portion of a housing showing the seal mounted on a shaft.

There is shown a shaft 10 having a shoulder 11 thereon which forms a shaft section of reduced diameter 12. The shaft 10 and its reduced section 12 pass through an opening 13 in a housing 14. Opening 13 is shown as having a counterbore 15 so that effectively the opening is enlarged, and received in this counterbore 15 is a ring 16 which provides a first annular sealing face 17. The ring 16 is held within the counterbore 15 by having an outwardly facing circumferential groove 18 in which is received an O-ring 19. The O-ring is sufficiently compressed so that the ring 16 is sealingly and mechanically held in position.

It will be apparent that the first annular sealing face 17 that has been associated with or referred to as being related to the ring 16 may in some instances be provided and associated with a housing such as 14 in other fashions than that illustrated in the drawings, which merely show a preferred method of associating the sealing face with the housing.

Figure 2:
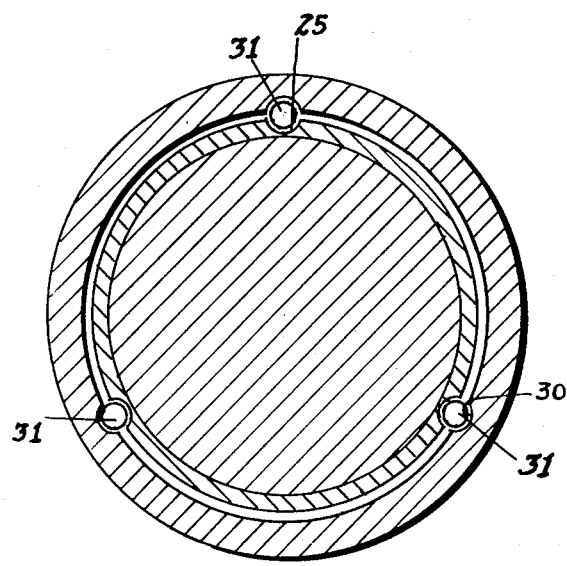
FIG. 2 is a sectional view taken on lines 2—2 thereof.
Figure 3:
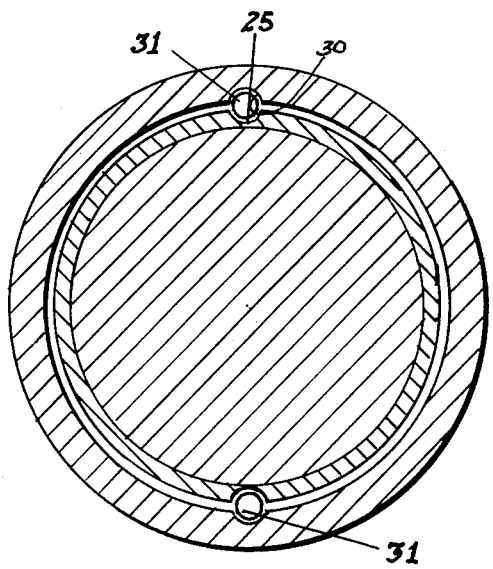
FIG. 3 is a sectional view taken on lines 2—2 showing a modified form.

Cooperating with the sealing member 16 is a second annular member generally designated 20. This annular member is made up of a pair of sleeves, there being an inner sleeve 21 and an outer sleeve 22. The inner sleeve 21 is received on the shaft section 12 in a manner to provide a rotary driving connection therewith. For example, the sleeve 21 may be a press fit onto the reduced diameter 12 of the shaft 10 or may be locked to the shaft section 12 in a variety of other ways as, for example, through the use of a threaded connection with a nut or other mechanical means which are obvious to those skilled in the art. To insure a fluid tight seal between the sleeve 21 and the shaft section 12, the sleeve 21 may be provided with a groove 23 in which an O-ring 24 is received, which O-ring is compressed into sealing engagement between the parts. About the outer surface of the sleeve 21, there is provided a plurality of axially extending grooves 25. In FIG. 2, three such grooves are shown, while in the embodiment of FIG. 3, two such grooves are shown. The inner sleeve 21 also is provided with a raised annular boss section 26, the purpose of which will be presently apparent.

Surrounding the inner sleeve 21 is the outer sleeve 22 which effectively telescopes therewith. Driving connection between the inner and outer sleeve is had by providing a plurality of axially extending grooves 30 of the same number as the grooves 25 and received in the grooves 25 and 30 is a ball 31. The ball is retained in position by a ring 32 that is received on the inner sleeve 21. It will also be apparent that the balls 31 serve as an anti-friction means permitting the outer sleeve 22 to telescope relative to the inner sleeve 21. In order to provide a seal between the two telescoping parts 21 and 22, a bellows 35 is provided, and this bellows is cemented as at 36 to the raised boss 26 of the inner sleeve and at 37 to the outer sleeve 22. It may, of course, be fastened in a number of other ways known to those skilled in the art but will extend effectively between the end wall 40 of the outer sleeve 22 and the inner sleeve 21, particularly the raised boss portion 26 thereof. This bellows does not provide any axial force of a sealing nature, that is, form any closing function and merely serves to provide a seal. Since pressure will normally be exerted radially inward, the bellows 35 will be deformed substantially as shown in the drawing.

The outer sleeve 22 may be provided with a carbon ring 42 which has a sealing face 43 that engages the sealing face 17 of the ring member 16. The outer sleeve 22 and the ring member 16 are urged together by magnetic force. To this end one of the parts would be made of a magnetizable material such as that sold under the trade name "Alnico" and the other part have a sufficient ferric content so that a magnetic flux may be established therebetween for attraction.

The magnetic attraction between the parts 16 and 22 is the sole force that maintains contact between them.

I claim:

1. In a seal between a housing part and a shaft extending through said housing part in which the shaft has axial and rotational movement relative to the housing part, a first annular member having a sealing face associated with said housing part, said face extending in a single plane normal to the axis of the shaft, a second annular member having a sealing face adapted to engage the first sealing face, said second annular member having an inner sleeve rotationally secured on said shaft in fluid tight engagement therewith and an outer sleeve having two end walls and carrying said second sealing face on one end wall thereof, said outer sleeve being telescopically disposed with respect to the inner sleeve providing substantially overlapped portions, means including in said overlapped portions at least a pair of axially extending grooves in the outer wall of the inner sleeve each having a bottom wall and at least a pair of axially extending grooves with a bottom wall in the inner wall of the outer sleeve in circumferential alignment with the grooves in the outer wall with antifriction ball means received in said grooves and engaging said bottom walls to allow the outer sleeve to telescope with respect to the inner sleeve, said grooves being of a length greater than the diameter of said ball means, means urging the sealing faces together and maintaining substantially constant pressure between said sealing faces and an expansible fluid tight seal between the other end wall of the outer sleeve and the inner sleeve.

2. In a seal as in claim 1 wherein a first annual sealing member is provided in the housing part, said member carrying the first annular sealing face and wherein said inner sleeve is press fitted onto the shaft.

* * * * *